A. J. FORTESCUE.
METALLIC TIRE.
APPLICATION FILED AUG. 31, 1909.

974,046.

Patented Oct. 25, 1910.
2 SHEETS—SHEET 1.

Witnesses:

Inventor
Albert J. Fortescue
By
James L. Norris

A. J. FORTESCUE.
METALLIC TIRE.
APPLICATION FILED AUG. 31, 1909.

974,046.

Patented Oct. 25, 1910.
2 SHEETS—SHEET 2.

Inventor
Albert J. Fortescue
By James L. Norris

UNITED STATES PATENT OFFICE.

ALBERT JOHN FORTESCUE, OF ARNCLIFFE, NEAR SYDNEY, NEW SOUTH WALES, AUSTRALIA.

METALLIC TIRE.

974,046.  Specification of Letters Patent. Patented Oct. 25, 1910.

Application filed August 31, 1909. Serial No. 515,474.

*To all whom it may concern:*

Be it known that I, ALBERT JOHN FORTESCUE, a subject of the King of Great Britain, residing at Arncliffe, near Sydney, in the State of New South Wales, Commonwealth of Australia, have invented certain new and useful Improvements in Metallic Tires, of which the following is a specification.

This invention has reference to improvements in devices for connecting the ends of metal tires for vehicle wheels and its object is to simplify the construction of means for that purpose.

Figure 1:
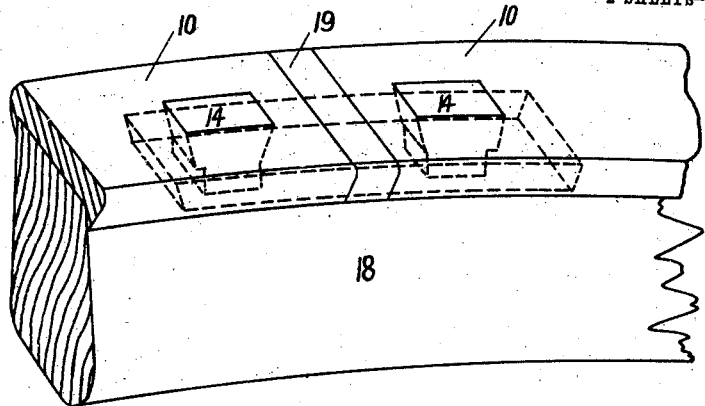
Figure 2:
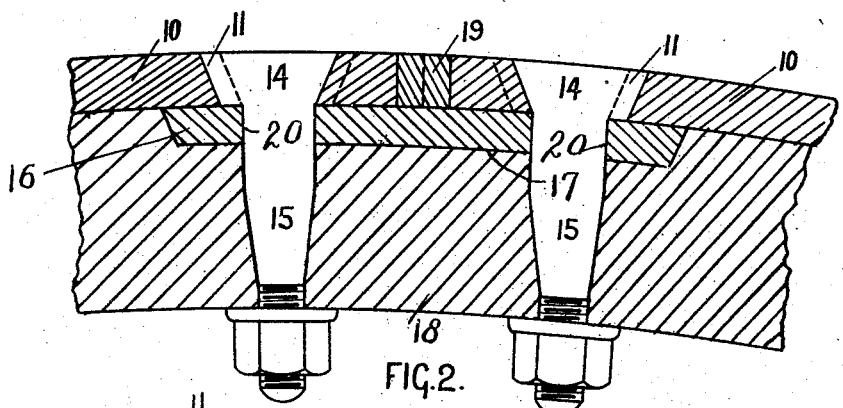
Figure 3:
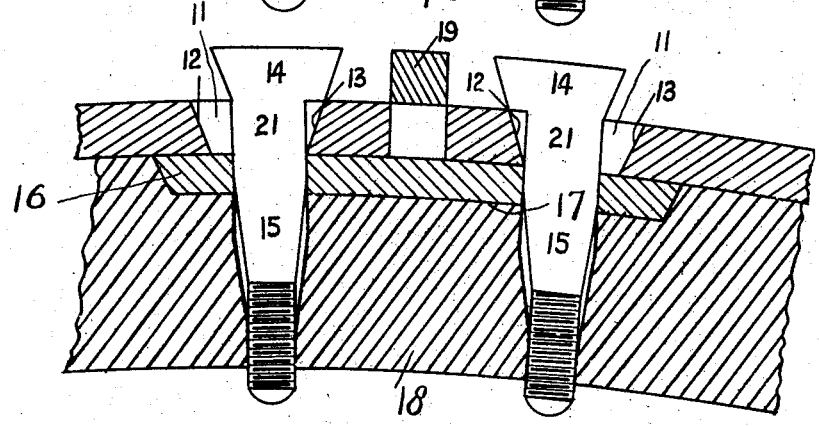
Figure 4:
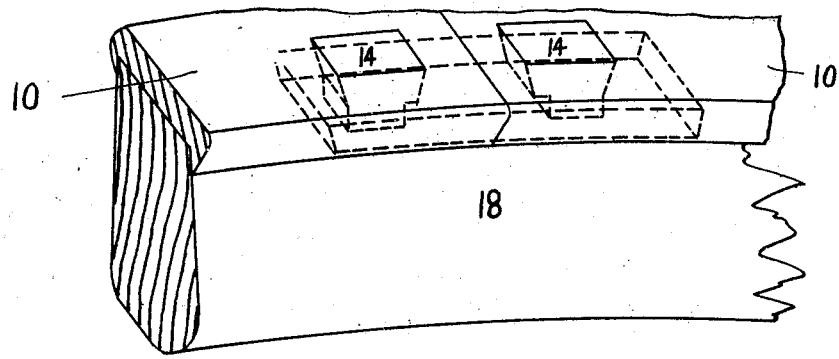
Figure 5:
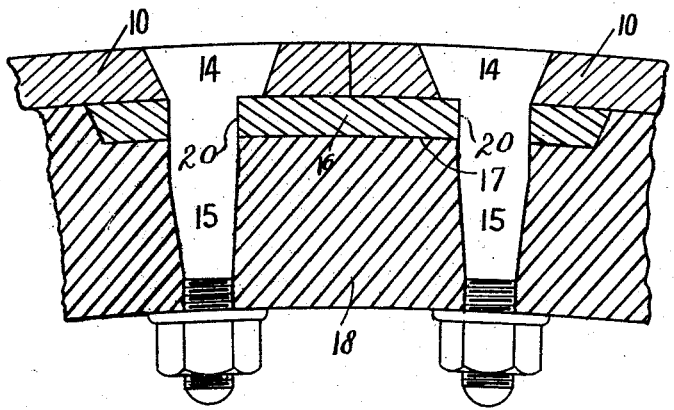
Figure 7:
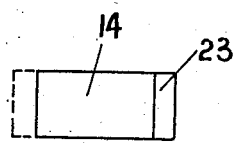
Figure 8:
Figure 6:
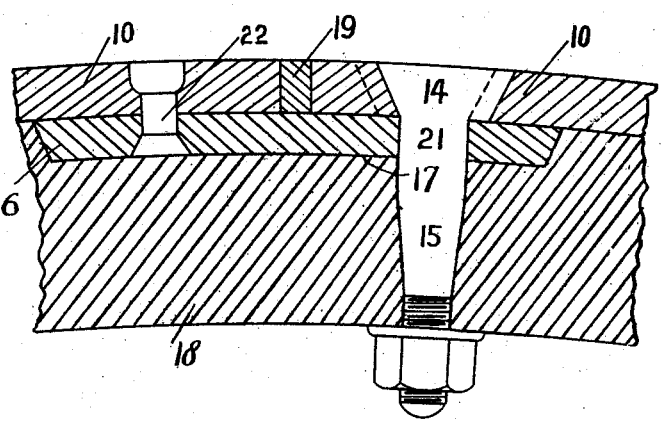

The invention is applicable to tires of channel iron and consists essentially of a bridge or connecting piece or plate which is secured at one or both ends of the tire by means of a wedge shaped pin or pins which is or are forced through a hole or holes therefor in one or both ends of the tire bridge plate and rim. Each wedge pin is threaded at its smaller end and when it has been forced in sufficiently a tightening nut with a washer or felly plate is screwed thereon in order to retain it in position. I prefer to insert between the ends of the tire a removable spacing piece or a filling piece which is burred on. As the rim shrinks the said spacing piece or said filling piece is removed and the ends made to abut in which case the wedge head or pins is or are turned round so that the wedge head or heads thereon takes or take up the space previously occupied by the spacing or filling piece, or the pins may be transposed into opposite holes with the same result. But in order that my invention may be readily comprehended, I will now refer to the drawings herewith, in which, Figure 1 is a perspective view of portion of a tire the ends of which are connected according to this invention. Fig. 2 is a sectional elevation of same, while, Fig. 3 shows the filling piece removed and the wedge pins released and turned the opposite way. Fig. 4 is another perspective view showing the tire ends abutting and the wedge pins turned the opposite way, while, Fig. 5 is a sectional elevation of same. Fig. 6 illustrates a modification, while, Figs. 7 and 8 are plan and elevation respectively of a modified form of the wedge pin and its backing piece.

The tire 10 has a slot or hole 11 at each end, the said holes being beveled as at 12 and 13 at opposite angles to each other for the purpose of receiving the wedge shaped heads 14 of the holding wedge pins 15. Under each end of the tire is a bridge plate 16 which lies in a recess 17 in the rim 18. A short filling piece 19 preferably composed of a section of the tire is secured between the ends of the tire by means of burring it thereto or to the bridge plate 16. Adjacent to each end of said bridge plate a hole 20 is made to fit the parallel necks 21 of the wedge shaped pins so as to prevent canting when the pins 15 are being driven home. The said pins have eccentric heads, that is, one end is longer from the center than the other end for the purpose hereinafter explained. If a spacing or filling piece secured by a bolt and nut is employed a hole may be made in the bridge plate through which the holding bolt may pass.

When the tire is first placed on the wheel it is heated in the usual manner and the wedge pins are driven in with the longer ends of the heads away from the joint the taper on the pins drawing the tire ends toward each other and when in position the holding nuts are screwed on.

When the tire becomes slack and requires adjusting the necessary packing is inserted between the tire and rim, and if further adjustment is subsequently needed owing to shrinkage the spacing piece or the short temporary filling piece 19 is removed from between the tire ends by means of a suitable tool. The pins 15 are then withdrawn and turned the opposite way or transposed into opposite holes so that the longer ends of the heads are turned inward toward the joint and having been driven home are screwed up to bring the ends to abut.

In the modification illustrated in Fig. 6 the bridge plate is riveted to one end of the tire at 22 and one wedge shaped pin employed to draw the ends of the tire together when adjustment is necessary.

Instead of having eccentric headed wedge pins I may have a loose backing piece such as 23 Figs. 7 and 8 which in the first instance is placed between the outer end of the head of the pin and the tire and when adjustment is necessary is placed at the inner end of the head as shown in dotted lines.

It is evident that the use of a clamp for drawing the ends of the tire together will rarely be necessary with any of the above described wedge pins.

Having thus described my invention what I claim as new and desire to cover by Letters Patent is:—

1. The combination with a wheel felly of a metal tire surrounding the same and having a peripherally elongated opening in an end thereof, and a securing bolt passed through the felly and having a head which conformably fits in the said opening and a shank which is not disposed in the opening, the head having an end portion at one side of the shank of greater length than the end portion at the opposite side of the shank, and means for connecting the other end of the tire and the felly.

2. The combination with a wheel felly of a metal tire surrounding the same and having a peripherally elongated opening in an end thereof, the opening having opposite walls thereof oppositely beveled in inwardly convergent relation, a securing bolt passed through the felly and having a head which is shaped to conformably fit in the opening and a shank which is not disposed in the opening, the head having an end portion at one side of the shank of greater length than the end portion at the opposite side of the shank and means for connecting the other end of the tire and the felly.

In testimony whereof I have hereunto set my hand in presence of two subscribing witnesses.

ALBERT JOHN FORTESCUE.

Witnesses:
CHARLES E. ERAHAUS,
HENRY WATCHORNE CLARKE.